United States Patent

Yatsuyanagi et al.

[11] Patent Number: 5,962,575
[45] Date of Patent: Oct. 5, 1999

[54] RUBBER COMPOSITION CONTAINING CARBON BLACK

[75] Inventors: Fumito Yatsuyanagi; Hiroyuki Kaido; Tetsuji Kawazura, all of Hiratsuka, Japan

[73] Assignee: The Yokohama Rubber Co., Ltd., Tokyo, Japan

[21] Appl. No.: 08/973,240

[22] PCT Filed: Mar. 27, 1997

[86] PCT No.: PCT/JP97/01051

§ 371 Date: Dec. 3, 1997

§ 102(e) Date: Dec. 3, 1997

[87] PCT Pub. No.: WO97/38047

PCT Pub. Date: Oct. 16, 1997

[30] Foreign Application Priority Data

| Apr. 5, 1996 | [JP] | Japan | 8-084225 |
| Dec. 10, 1996 | [JP] | Japan | 8-329546 |
| Jan. 6, 1997 | [JP] | Japan | 9-000336 |
| Mar. 17, 1997 | [JP] | Japan | 9-063452 |

[51] Int. Cl.$^6$ .................... C08K 3/00
[52] U.S. Cl. ............... 524/495; 524/496; 525/333.6; 525/377
[58] Field of Search .............. 525/375, 333.6; 524/495, 496

[56] References Cited

U.S. PATENT DOCUMENTS

| 4,647,625 | 3/1987 | Aonuma et al. | 528/232 |
| 4,748,168 | 5/1988 | Kawakami et al. | 524/474 |
| 4,753,991 | 6/1988 | Bronstert | 525/98 |

FOREIGN PATENT DOCUMENTS

| 3-84002 | 4/1991 | Japan. |
| 384002 | 4/1991 | Japan. |
| 5-112676 | 5/1993 | Japan. |
| 7-53781 | 2/1995 | Japan. |

*Primary Examiner*—Edward J. Cain
*Attorney, Agent, or Firm*—Finnegan, Henderson, Farabow, Garrett & Dunner, L.L.P.

[57] ABSTRACT

A carbon-containing rubber composition containing a rubber composition containing carbon black, obtained by coagulating, dehydrating, and drying a rubber latex mixture containing a latex of at least one starting rubber A having an average glass transition temperature TgA of $-120°$ C. to $-15°$ C., carbon black, and part of a softening agent, mixed in an internal mixer with a starting rubber B and part of the softening agent, with a ratio $F_A/F_B$ of the concentration $F_A$ of carbon black in the copolymer in the rubber latex mixture with the concentration $F_B$ of carbon black in the copolymer after kneading by the hermetic mixture being 1.2 to 3.0 and a rubber composition containing carbon black comprising a starting rubber A' comprising a polymer having functional groups represented by formula (I)

$$-C=N'- \qquad (I)$$

bonded with a polymer chain directly or through another atomic group or a terminal modified diene-based polymer first brought into contact with carbon black, then blended with a starting rubber B' comprising a diene based stock rubber.

21 Claims, No Drawings

RUBBER COMPOSITION CONTAINING CARBON BLACK

TECHNICAL FIELD

The present invention relates to a rubber composition containing carbon black, more specifically relates to a carbon black-containing rubber composition suitable for use for the tread of a pneumatic tire.

BACKGROUND ART

Proposals have been made to improve the balance of the tans of tire tread rubber for reducing the fuel consumption of automobiles. More specifically, combinations of ingredients, separate mixing, and use of terminal modified rubber have been proposed.

For example, Japanese Unexamined Patent Publication (Kokai) No. 59-159839 describes a rubber composition obtained by wet mixing SBR and BR with different styrene contents, while Japanese Unexamined Patent Publication (Kokai) No. 2-129241 describes a process of production of a rubber composition comprising mixing a terminal modified/coupled rubber in a solution with carbon black, then mixing in a diene based rubber. On the other hand, Japanese Unexamined Patent Publication (Kokai) No. 58-152031 discloses a master batch comprising SBR and BR, while Japanese Unexamined Patent Publication (Kokai) No. 57-00430 proposes separately mixing a high molecular weight rubber and low molecular weight rubber to produce a rubber composition.

Further, Japanese Examined Patent Publication (Kokoku) No. 5-1298 describes a rubber composition which improves the impact resilience and tensile strength of a vulcanite comprising a conjugated diene-based polymer having an aromatic tertiary amino group at a terminal portion of the conjugated diene-based polymer. On the other hand, Japanese Unexamined Patent Publication (Kokai) No. 55-10434 describes, when producing a rubber composition for a tire tread by blending carbon black into a starting rubber comprising an amorphous 1,2-polybutadiene rubber and natural rubber and/or polyisoprene rubber (further possibly including a partially conjugated diene-based rubber), first mixing at least 25% by weight of the starting rubber component containing 1,2-polybutadiene and carbon black in a specific ratio, then adding and mixing in the remaining starting rubber to improve the fuel economy and safety of automobiles. Further, Japanese Unexamined Patent Publication (Kokai) No. 2-129241 proposes blending a terminal modified conjugated diene-based polymer with carbon black in an organic solvent to improve the tensile strength and abrasion resistance of the vulcanite.

Further, Japanese Unexamined Patent Publication (Kokai) No. 8-269243 discloses blending a high glass transition point SBR and a low glass transition point SBR master batch carbon black-containing.

However, the above separate mixing method of ingredients, use of terminal modified rubber, and other arts have problems, for example, the low effect in systems containing high amounts of oil and carbon black and improvements are still sought. Further, in the case of separate mixing, the concentration of the carbon black at the time of the initial mixing is increased and deterioration of the processability occurs such as scorching at the time of mixing. The amount of blending of the carbon black which can be separately mixed is also limited. Further, with use in generally used master batches, the desired effects are not obtained, therefore it becomes essential to modify the master batches.

DISCLOSURE OF THE INVENTION

Accordingly, an object of the present invention is to provide a rubber composition which can be suitably used as a tire tread superior in tans balance of the vulcanized rubber while maintaining the abrasion resistance.

In accordance with a first embodiment of the present invention, there is provided a rubber composition comprising a carbon black-containing rubber composition, obtained by coagulating, dehydrating and drying a rubber latex mixture containing 50 to 90 parts by weight of, in terms of the solid contents latex of at least one starting rubber A having an average glass transition temperature TgA of −120° C. to −15° C., 40 to 100 parts by weight of carbon black, and at least 70 parts by weight of a softening agent, mixed in a hermetic mixer with an amount of a starting rubber B giving 100 parts by weight of total rubber content and an amount of softening agent giving 80 parts by weight of total softening agent, with a ratio $F_A/F_B$ of the concentration $F_A$ of carbon black in the copolymer in the rubber latex mixture with the concentration $F_B$ of carbon black in the copolymer after mixing by the internal mixture being 1.2 to 3.0.

In accordance with a second embodiment of the present invention, there is provided a rubber composition containing carbon black, prepared using starting rubbers dissolved in an organic solvent, comprising a starting rubber A' comprising a polymer having functional groups expressed by formula (I)

$$—C{=}N^+—\qquad(I)$$

bonded with a polymer chain directly or through another group of atoms or a terminal modified diene-based polymer first brought into contact with carbon black, then blended with a starting rubber B' comprised of a diene-based stock rubber.

In accordance with a third embodiment of the present invention, there is provided a rubber composition containing carbon black prepared using a starting rubber dissolved in an organic solvent or a starting rubber made into an aqueous emulsion, comprised of a stock rubber A' with an average glass transition temperature TgA' of −120 to −15° C. first brought into contact with carbon black, then blended with a starting rubber B' having an average glass transition temperature TgB' at least 10° C. higher than TgA'.

BEST MODE FOR CARRYING OUT THE INVENTION

The constitution, action, and effects of the first embodiment of the present invention will be explained in detail below.

The present inventors found that tanδ of a rubber composition has almost no relation with the rubber absorption phase near the carbon black or other filler and is due to only the matrix phase and succeeded in improving the balance of tans by separating as much as possible the carbon black surface and matrix phase.

Further, the present inventors found that by evenly distributing carbon black in high Tg and low Tg starting rubber so as to cause it to concentrate in the low Tg starting rubber, the temperature gradient of the tanδ at 60° C. to 0° C. became better and that it was possible to use this to improve the balance of tanδ.

Therefore, in the present invention, from the viewpoint of the interaction of the carbon black and rubber, the rubber matrix phase far from the carbon in the compound is made to be not restrained by the carbon so as to control the tans.

Specifically, by mixing a predetermined master batch comprising a latex of a starting rubber of a group A with an average glass transition temperature TgA of −120° C. to −15° C., preferably −120° C. to −20° C., and carbon black and a starting rubber group B of an average glass transition temperature TgB of at least TgA+10° C., a softening agent, and other rubber additives in an internal mixer, it is possible to obtain the desired rubber composition.

As the carbon black used in the present invention, in the case of a tire tread, one with a nitrogen specific area ($N_2SA$) (measured based on ASTM D 3037) of preferably 50 to 200 $m^2/g$, more preferably 80 to 160 $m^2/g$, and a DBP oil absorption (measured based on JIS K 6221) of preferably 60 to 140 ml/100 g, more preferably 100 to 130 ml/100 g is used. Note that the carbon black used may be one which is given an organic or inorganic surface treatment or has a small amount of silica or other metallic oxide deposited on its surface to increase the bonding with rubber.

The amount of blending of the carbon black blended in the rubber composition of the present invention, that is, the rubber composition containing carbon black, is 40 to 100 parts by weight, based upon 100 parts by weight of the final rubber polymer, preferably 50 to 100 parts by weight. If the amount of the carbon black blended is too small, the reinforcing effect falls and the desired physical properties are not obtained, while if too great the production of the carbon black master batch becomes difficult.

The carbon black master batch according to the present invention, that is, the rubber composition containing carbon black, is not particularly limited so long as the glass transition temperature TgA is satisfied, but a conjugated diene-based polymer is particularly preferable. As such a conjugated diene-based polymer, butadiene, isoprene, pentadiene, chloroprene, and other conjugated dienes alone or in polymers or copolymers of two or more, copolymers of at least one conjugated diene and at least one monomer copolymerizable with the same, for example, an aromatic vinyl compound such as styrene, vinyl toluene, and α-methyl styrene, an unsaturated nitrile compound such as acrylonitrile and methacrylonitrile, unsaturated carboxylic acids such as acrylic acid, methacrylic acid, maleic acid, and anhydrous maleic acid, unsaturated carboxylic acid esters such as methyl acrylate, ethyl acrylate, butyl acrylate, and methoxyethyl acrylate, etc. may be mentioned. A particularly preferable polymer is a block copolymer having a polymer block comprised mainly of a conjugated diene and a polymer block comprised mainly of an aromatic vinyl compound. The boundary between the blocks in the block copolymer may be clear or not clear. Further, the ratios of the blocks is 0 to 100% by weight of conjugated diene and 0 to 100% by weight of aromatic vinyl diene, preferably 20 to 80% by weight of conjugated diene and 20 to 80% by weight of aromatic vinyl diene.

The amounts of the rubber polymers blended differ according to the type of the starting rubber to be added, the contents in the polymer, molecular weight of the polymer, etc., but generally is 50 to 90 parts by weight, more preferably 50 to 70 parts by weight per 100 parts by weight of the rubber copolymer. If the amount of the rubber polymer is too small, it is difficult to produce the carbon master batch, while if too large, the desired effects cannot be obtained.

The method of blending the latex containing carbon black containing the starting rubber A is not particularly limited, but in general it is sufficient to mix and stir the rubber latex in which carbon black and the softening agent have been uniformly dispersed, then follow a usual method to coagulate, dehydrate, and dry the same. The softening agent used here may be an aromatic process oil, a paraffin based oil, or other oil generally used for rubber formulations blended in an amount of not more than 70 parts by weight, preferably 0 to 55 parts by weight.

On the other hand, as the stock rubber B, there is no particular problem so long as the above glass transition temperature is satisfied, but preferably an emulsion polymerized or solution polymerized diene-based starting rubber (polybutadiene, styrene-butadiene copolymer, styrene-isoprene-butadiene copolymer, polyisoprene, or natural rubber), etc. may be mentioned.

The amounts of blending of these stock rubbers B are amounts giving 100 parts by weight of the rubber as a whole, that is, 50 to 10 parts by weight. If necessary, it may be mixed with the above rubber composition containing carbon black together with an additional softening agent or other general use rubber additives in a Banbury mixer or other hermetic mixer to obtain the desired rubber composition.

According to the present invention, preferably the average weight-average molecular weight Mw(A) of the stock rubber A is 100,000 to 1,200,000, the average weight average molecular weight Mw(B) of the starting rubber B is at least 200,000, and the relationship of $0.1 \leq Mw(A)/Mw(B) \leq 6.0$ stands.

According to the present invention, the ratio $F_A/F_B$ of the concentration $F_A$ of carbon black in the copolymer in the rubber latex mixture with the concentration $F_B$ of carbon black in the copolymer after kneading by the hermetic mixture is preferably 1.2 to 3.0.

According to the present invention, the tanδ (0° C.) of the rubber composition used for a cap tread is at least 0.4 and the tanδ (60° C.) is at least 0.1.

Next, the constitutions, actions, and effects of the second and third embodiments of the present invention will be explained in detail.

The average glass transition temperature TgA' of the polymer A' and the average glass transition temperature TgB' of the diene-based polymer B' preferably satisfy the following relationships:

$$TgA'+20° C. > TgB' > TgA'10° C. \tag{1}$$

$$20° C. > TgA' > -45° C. \tag{2}$$

That is, there is preferably provided a rubber composition containing rubber black which is characterized by preparation using a rubber composition containing carbon black in which is blended a stock rubber B' comprising a diene-based starting rubber which is incompatible viscoelastically with the polymer A' and preferably has an average glass transition temperature TgB' more than 20° C. higher than TgA' or a starting rubber dissolved in an organic solvent and in which the starting rubber A' comprising a terminal modified and/or coupled solution polymerized rubber is first brought into contact with carbon black, then blended with the starting rubber B' comprising the diene-based starting rubber, where the average glass transition temperature TgA' of the polymer A' and the average glass transition temperature TgB' of the diene based polymer B' satisfies the following relationships:

$$TgA'+20° C. > TgB' > TgA'-10° C.$$

$$20° C. > TgA' > -45° C.$$

The carbon black-containing rubber composition according to the second embodiment of the present invention preferably has the weight average molecular weight Mw(A') of the diene-based starting rubber A' of a molecular weight of a range of 100,000 to 1,200,000 and the weight average molecular weight Mw(B') of the diene-based starting rubber B' of a molecular weight of a range of at least 400,000 satisfying the following relationship:

$$0.08 \leq Mw(A')/Mw(B') \leq 1.5$$

The rubber composition containing carbon black according to the third embodiment of the present invention preferably has the weight average molecular weight Mw(A') of the diene-based starting rubber A' of a molecular weight of a range of 100,000 to 1,200,000 and the weight average molecular weight Mw(B') of the diene-based starting rubber B' having a molecular weight of a range of at least 400,000 satisfying the following relationship:

$$0.1 \leq Mw(A')/Mw(B') \leq 6.0$$

The present inventors found that the tanδ of a rubber composition has almost no relation with the rubber absorption phase near the carbon black or other filler and is due to only the matrix phase and succeeded in improving the balance of tans by separating as much as possible the carbon black surface and matrix phase.

Further, the present inventors found that by evenly distributing carbon black in high Tg and low Tg starting rubber so as to cause it to concentrate in the low Tg starting rubber, the temperature gradient of the tanδ at 60° C. to 0° C. became better and that it was possible to use this to improve the balance of tanδ. More preferably, the effect is greater the more the Tg of the high Tg component is brought closer to −20° C. in addition to the viscoelastic incompatibility of the two types of starting rubbers and the separation of the Tg's of the two.

Therefore, in the former, by bringing a polymer having a high reactivity with the surface of carbon black and with functional groups represented by formula (I) bonded with the polymer chain directly or through another atomic group into contact with the carbon black to cover the surface of the carbon black and then adding an emulsion polymerized diene-based starting rubber having a low reactivity, it is possible to provide a rubber composition containing carbon black used for obtaining a tire tread use rubber composition superior in the tanδ balance of the vulcanized rubber. On the other hand, in the latter, it is possible to provide a rubber composition containing carbon black used for obtaining a tire tread use rubber composition superior in the tanδ balance of the vulcanized rubber by bringing a low Tg starting rubber and carbon black into contact to cover the surface of the carbon black and then add a high Tg starting rubber.

As the carbon black used in the present invention, in the case of a tire tread, those having a nitrogen specific area (measured based on ASTM D 3037) of preferably 30 to 250 m$^2$/g, more preferably 35 to 200 m$^2$/g and a DBP oil absorption (measured based on JIS K 6221) of preferably 90 to 180 ml/100 g may be used. Note that the carbon black used may be one which is given an organic or inorganic surface treatment or has a small amount of silica or other metallic oxide deposited on its surface to increase the bonding with rubber.

In the present invention, as the polymer A', (1) a polymer with functional groups represented by the formula (I) bonded to the polymer chain directly or through another atomic group or (2) a diene-based polymer is brought into contact with the above carbon black. The polymer having functional groups of formula (I) may be obtained by reacting the following organic compounds with a living anion polymer obtained by polymerizing a polymerizable monomer by an alkali metal and/or alkali earth metal catalyst (so called anionic polymerization catalyst) and having said metal at its terminal or a polymer obtained by causing addition of said metal by a later reaction to an unsaturated polymer having a double bond in the polymer chain or side chain and then performing hydrolysis. (See Japanese Unexamined Patent Publication (Kokai) No. 58-162604, Japanese Unexamined Patent Publication (Kokai) No. 60-137913, Japanese Unexamined Patent Publication (Kokai) No. 7-316461, etc.)

As the polymerization catalyst using the metal as a substrate, a catalyst conventionally used for anionic polymerization may be used. The type is not particularly limited. As a preferably alkali catalyst, n-butyl lithium, sec-butyl lithium, and other organolithium compounds having 2 to 20 carbon atoms may be mentioned as representative examples. As the alkali earth metal catalyst, for example, the catalytic systems comprised mainly of barium, strontium, calcium, or other compounds disclosed in Japanese Unexamined Patent Publication (Kokai) No. 51-115590, Japanese Unexamined Patent Publication (Kokai) Nos. 52-9090, 17591, 30543, 48910, 98077, Japanese Unexamined Patent Publication (Kokai) No. 56-112916 and 118403, Japanese Unexamined Patent Publication (Kokai) No. 57-100146, Japanese Unexamined Patent Publication (Kokai) No. 7-316461, etc. may be mentioned, but the invention is not limited to these.

The above polymerization reaction and alkali metal and/or alkali earth metal addition reaction may be performed in a solvent not destroying the metal catalyst such as has been used in anionic polymerization in the past, for example, a hydrocarbon solvent (for example, a hydrogenate of oil fractions, spindle oil, or other machine oil), tetrahydrofuran, tetrahydropyrane, and dioxane.

As the organic compounds used in the above reaction, for example, N-methyl-β-propiolactam, N-t-butyl-β-propiolactam, N-phenyl-β-propiolactam, N-methoxyphenyl-β-propiolactam, N-naphthyl-β-propiolactam, N-methyl-2-pyrrolidone, N-t-butyl-2-pyrrolidone, N-phenyl-pyrrolidone, N-methoxyphenyl-2-pyrrolidone, N-vinyl-2-pyrrolidone, N-benzyl-2-pyrrolidone, N-naphthyl-2-pyrrolidone, N-methyl-5-methyl-2-pyrrolidone, N-t-butyl-5-methyl-2-pyrrolidone, N-phenyl-5-methyl-2-pyrrolidone, N-methyl-3,3'-dimethyl-2-pyrrolidone, N-t-butyl-3,3'-dimethyl, -2-pyrrolidone, N-phenyl-3,3'-dimethyl, -2-pyrrolidone, N-methyl-piperidone, N-t-butyl-2-piperidone, N-phenyl-2-piperidone, N-methoxyphenyl-2-piperidone, N-vinyl-2-piperidone, N-benzyl-2-piperidone, N-naphthyl-2-piperidone, N-methyl-3,3'-dimethyl-2-piperidone, N-phenyl-3,3'-dimethyl-2-piperidone, N-methyl-ε-caprolactam, N-phenyl-ε-caprolactam, N-methoxyphenyl-ε-caprolactam, N-vinyl-ε-caprolactam, N-benzyl-ε-caprolactam, N-naphthyl-ε-caprolactam, N-methyl-ω-laurolactam, N-phenyl-ω-laurolactam, N-t-butyl-ω-laurolactam, N-vinyl-ω-laurolactam, N-benzyl-ω-laurolactam, and other N-substituted lactams and their corresponding thiolactams; 1,3-dimethylethylene urea, 1,3-diphenylethylene urea, 1,3-di-t-butylethylene urea, 1,3-divinylethylene urea, and other N-substituted ethylene ureas and corresponding N-substituted thioethylene ureas, and other compounds having in their molecules bonds of the formula (II):

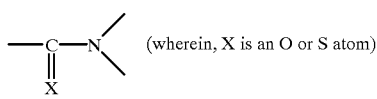

(II)

(wherein, X is an O or S atom)

for example, 4-dimethylaminobenzophenone, 4-diethylaminobenzophenone, 4-di-t-butylaminobenzophenone, 4-diphenylbenzophenone, 4,4'-bis(dimethylamino) benzophenone, 4,4'-bis(diethylamino)benzophenone, 4,4'-bis(di-t-butylamino)benzophenone, 4,4'-bis(diphenylamino) benzophenone, 4,4'-bis(divinylamino)benzophenone, 4-dimethylaminoacetophenone, 4-diethylaminoacetophenone, 1,3-bis(diphenylamino)-2-propanone, 1,7-bis (methylethylamino)-4-heptanone, and other N-substituted aminoketones and corresponding N-substituted aminothioketones; 4-dimethylaminobenzaldehyde, 4-diphenylaminobenzaldehyde, 4-divinylaminobenzaldehyde, and other N-substituted aminoaldehydes and corresponding N-substituted aminothioaldehydes may be mentioned as preferable examples. The amounts of these compounds used are preferably in the range of 0.05 mol to 10 mol per mole of the alkali metal and/or alkali earth metal catalyst used when adding the metal for polymerization by anionic polymerization and a later reaction. If the value is less than 0.05 mole, there is the possibility of a difficulty in a sufficient catalyzation/reaction with the carbon and conversely if over 10 moles, there is a possibility of the secondary reactions causing the produced polymer to become difficult to mix with the polymers to be mixed with later. More preferably the range is 0.2 mole to 2 mole. The reaction usually is performed at a range of room temperature to 100° C. for several seconds to several hours. The polymer which is produced may be covered from the reaction solution by steam stripping after the reaction ends. Further, the reaction solvent may be distilled off from the reaction solution and the polymer temperature raised for steam stripping.

Particularly preferable as the carbon black master batch according to the present invention, that is, the rubber composition containing carbon black, is a conjugated diene-based polymer with at least one of the above functional group bonded to one or two ends of the polymer chain or bonded to a side chain of the polymer chain. As such conjugated dienes, butadiene, isoprene, pentadiene, chloroprene, and other conjugated dienes alone or in polymers or copolymers of two or more, copolymers of at least one type conjugated diene and at least one type monomer copolymerizable with the same, for example, an aromatic vinyl compound such as styrene, vinyl toluene, and a-methyl styrene, a unsaturated nitrile compound such as acrylonitrile and methacrylonitrile, unsaturated carboxylic acids such as acrylic acid, methacrylic acid, maleic acid, and anhydrous maleic acid, unsaturated carboxylic acid esters such as methyl acrylate, ethyl acrylate, butyl acrylate, and methoxyethyl acrylate, etc. may be mentioned, but the invention is not limited to these. It is possible to bring these into contact with carbon black and select the optimal polymer according to the type of polymer to be added later, but the type of the polymer is not particularly limited. Similarly, there is no particular limitation to the molecular weight. Polymers from oligomers (weight average molecular weight of at least 500) to high molecular weight (weight average molecular weights of several 100,000) are included. Further, similarly, the organic compound having the bond of the formula (II) may be reacted with one or both of carbanions derived from a conjugated diene and carbanions derived from an aromatic vinyl compound. A particularly preferable polymer is a block copolymer having a polymer block comprised mainly of a conjugated diene and a polymer block comprised mainly of an aromatic vinyl compound. The boundary between the blocks in the block copolymer may be clear or not clear. Further, the ratios of the blocks is 0 to 100% by weight of conjugated diene and 0 to 100% by weight of aromatic vinyl diene, preferably 20 to 80% by weight of conjugated diene and 20 to 80% by weight of aromatic vinyl diene.

The amounts of the polymers blended differ according to the type of the starting rubber to be blended later, the contents of each in the starting rubber, molecular weight of the stock rubber, etc., but preferably is 30 to 200 parts by weight, more preferably 50 to 150 parts by weight based upon 100 parts by weight of the carbon black.

As the method of blending, the polymer is dissolved in a solvent in advance and in that state is mixed and stirred with carbon black uniformly dispersed in a solvent in order to bring the two into contact. Next, the stock rubber of the group B to be mixed in is dissolved in a solvent, then is added to the carbon black/polymer mixture which is then reprecipitated, filtered, and dried to obtain the desired rubber composition containing carbon black. Further, it is possible to bring a polymer and carbon black into contact in advance and dry the same to obtain a carbon black/polymer mixture to which is then added and mixed the stock rubber of the group B by a hermetic mixer so as to obtain the desired rubber composition containing carbon black.

On the other hand, the diene-based starting rubber which is used when bringing a diene-based starting rubber into contact with carbon black may be a terminal modified and/or coupled diene-based starting rubber synthesized by solution polymerization (polybutadiene, styrene-butadiene copolymer, styrene-isoprene-butadiene copolymer) or a non terminal modified diene-based starting rubber obtained by emulsion polymerization or solution polymerization (polybutadiene, styrene-butadiene copolymer, styrene-isoprene-butadiene copolymer, polyisoprene, natural rubber) etc. The starting rubber used may be one in the latex stage depending on the type of the rubber which is to be added later. The terminal modified diene-based starting rubber used, as described in Japanese Unexamined Patent Publication (Kokai) No. 64-60604, may be obtained by reacting in an ordinary method between an alkali metal (for example, Li) or alkali earth metal (for example, Mg) of the synthesis terminal of a solution polymerized styrene-butadiene copolymer, butadiene polymer, or other starting rubber and a compound having a bond of the above formula (II) in the molecule (N,N'-diethylformamide, N,N'-dimethylacetoamide, N,N'-methylbenzamide, or other amides, N,N'-dimethylethylene urea or other ureas, ε-caprolactam, N-methyl-ε-caprolactam, N-methyl-ε-2-pyrrolidone, N-vinyl-ε-2-pyrrolidone, and other lactams and other compounds described in Japanese Unexamined Patent Publication (Kokai) No. 61-103904, 1,3-dimethyl-2-imidazoylidinone, 1,3-dimethylethylene thiourea, and other compounds described in Japanese Unexamined Patent Publication (Kokai) No. 61-268702, etc. may be mentioned). The higher the rate of modification of the synthesis terminal at this time, the greater the effect. It is usually preferable to use one with a rate of modification of at least 20%.

The coupled diene-based starting rubber used in the present invention may be obtained by an ordinary method by causing a reaction between the alkali metal or alkali earth metal of the molecular terminals of a solution polymerized styrene-butadiene copolymer, butadiene polymer, or other rubber or the residual terminal alkali metal or alkali earth metal of the diene-based starting rubber terminal modified by the above method diene, preferably at least 20%, more preferably 30 to 50%, and for example a tin halide or silicon halide in accordance with the usual method.

The amount of the starting rubber blended differs according to the type of the starting rubber to be blended later, the contents of each in the starting rubber, molecular weight of the starting rubber, etc., but preferably is 30 to 200 parts by weight, more preferably 50 to 150 parts by weight per 100 parts by weight of the carbon black.

As the method of blending the carbon black, the starting rubber is dissolved in a solvent in advance and in that state is mixed and stirred with carbon black uniformly dispersed in a solvent in order to bring the two into contact. Next, the starting rubber B' to be mixed in is dissolved in a solvent, then is added to the carbon black/polymer mixture which is then reprecipitated, filtered, and dried to obtain the desired rubber composition containing carbon black. Further, when using a latex, as described in Japanese Unexamined Patent Publication (Kokai) No. 59-49247 and Japanese Unexamined Patent Publication (Kokai) No. 63-43937, first an aqueous dispersion (slurry) of the carbon is prepared, then the latex and slurry are mixed and stirred to cause contact/reaction. The latex of the starting rubber B' is then added to the above mixture, acid is used to cause coagulation, then the mixture is filtered and dried to obtain the desired rubber composition containing carbon black. Further, it is possible to bring the carbon black and starting rubber or latex into contact in advance and dry and coagulate the same to obtain a carbon black/stock rubber (latex) mixture to which is then added and mixed the starting rubber B' by a hermetic mixer so as to obtain the desired rubber composition containing carbon black.

As the starting rubber B' which is additionally mixed in at the later step, a terminal modified and/or coupled diene-based starting rubber synthesized by solution polymerization (polybutadiene, styrene-butadiene copolymer, styrene-isoprene-butadiene copolymer) or a non terminal modified diene-based starting rubber obtained by emulsion polymerization or solution polymerization (polybutadiene, styrene-butadiene copolymer, styrene-isoprene-butadiene copolymer, polyisoprene, natural rubber) etc. The starting rubber used may be one in the latex stage depending on the type of the rubber which is to be added later.

In the present invention, it is also possible to add an aromatic process oil, naphthene based process oil, etc. as an additive for adjusting the viscosity of the carbon black/stock rubber mixture. The amount added may be changed according to the objective of use etc.

As explained above, according to the present invention, when the average glass transition temperature TgA' of the starting rubber A' and the average glass transition temperature TgB' of the diene-based starting rubber B' satisfies the following relationships:

$TgA'+20° C.>TgB'>TgA'-10° C.$ $20° C.>TgA'>-45° C.$ by sufficiently providing the polymer absorption phase by the starting rubber A' at the surface of the carbon black, it is possible to separate the diene-based starting rubber B' forming the matrix phase as much as possible whereby the desired effect is obtained. Further, when the average glass transition temperature TgA' of the starting rubber A' is from −120° C. to −15° C. and the diene-based starting rubber B' has an average glass transition temperature TgB' at least 10° C. more than TgA', since carbon is sufficiently taken in to the starting rubber A', the added diene-based starting rubber B' is not restrained by the carbon. When the polymers A' and B' are viscoelastically incompatible and TgB' is at least 20° C. more than TgA', the polymer B' is not affected viscoelastically by the carbon black and the desired effect can be obtained.

INDUSTRIAL APPLICABILITY

As explained above, according to the present invention, it is possible to improve the scorching at the time of mixture and further to improve the balance of the tanδ by using a master batch. It is possible to obtain the effect of improvement equal to or better than that of separate mixture no matter what the concentration of the carbon without having to consider scorching at the time of mixing due to the rise in the concentration of the carbon in conventional separate mixing and it is possible to use the invention for any formulation.

EXAMPLES

The present invention will now be explained in further detail by, but is not limited to, Examples.

Examples I-1 to I-8, Standard Examples I-1 to I-8, and Comparative Examples I-1 to I-8

The rubber compositions of the formulations shown in Tables I-1 to 1-4 were prepared and evaluated for physical properties.

The ingredients used for the formulations of the Standard Examples, Examples, and Comparative Examples were as follows:

Master Batches I-1 to I-3

Starting rubber latex: a styrene-butadiene copolymer rubber latex having a styrene content of 25%, a vinyl content of 16%, a glass transition temperature of −51° C., and a weight average molecular weight of 620,000.

Carbon black: ISAF grade carbon black having an $N_2SA$ ($m^2$/g) of 112 and a DBP oil absorption (ml/100 g) of 112.

Softening agent: aromatic process oil

|  | Starting rubber latex (parts by weight) | Carbon black (parts by weight) | Softening agent (parts by weight) |
| --- | --- | --- | --- |
| Master batch I-1 | 50 | 75 | 50 |
| Master batch I-2 | 50 | 60 | 35 |
| Master batch I-3 | 50 | 50 | 25 |

Master Batches I-4 to I-5

Starting rubber latex: a styrene-butadiene copolymer rubber latex having a styrene content of 25%, a vinyl content of 16%, a glass transition temperature of −51° C., and a weight average molecular weight of 620,000.

Carbon black: HAF grade carbon black having an $N_2SA$ ($m^2$/g) of 92 and a DBP oil absorption (ml/100 g) of 117.

Softening agent: aromatic process oil

|  | Starting rubber latex (parts by weight) | Carbon black (parts by weight) | Softening agent (parts by weight) |
| --- | --- | --- | --- |
| Master batch I-4 | 70 | 85 | 50 |
| Master batch I-5 | 70 | 65 | 30 |

Master Batches I-6 to I-7

Starting rubber latex: a polyisoprene rubber latex having a glass transition temperature of −63° C. and a weight average molecular weight of 1,200,000 and a cis-polybutadiene rubber latex having a glass transition temperature of −106° C. and a weight average molecular weight of 650,000

Carbon black: HAF grade carbon black having an $N_2SA$ ($m^2/g$) of 84 and a DBP oil absorption (ml/100 g) of 130.

Softening agent: aromatic process oil

|  | Starting rubber latex (parts by weight) | Carbon black (parts by weight) | Softening agent (parts by weight) |
|---|---|---|---|
| Master batch I-6 | 50 | 50 | 10 |
| Master batch I-7 | Isoprene: 50 Butadiene: 20 | 50 | 10 |

Master Batch I-8

Starting rubber latex: a styrene-butadiene copolymer rubber latex having a styrene content of 36%, a vinyl content of 16%, a glass transition temperature of −36° C., and a weight average molecular weight of 820,000.

Carbon black: HAF grade carbon black having an $N_2SA$ ($m^2/g$) of 153 and a DBP oil absorption (ml/100 g) of 127.

Softening agent: aromatic process oil

|  | Starting rubber latex (parts by weight) | Carbon black (parts by weight) | Softening agent (parts by weight) |
|---|---|---|---|
| Master batch I-8 | 60 | 95 | 52 |

Master Batch I-9

Starting rubber latex: a styrene-butadiene copolymer rubber latex having a styrene content of 25%, a vinyl content of 16%, a glass transition temperature of −51° C., and a weight average molecular weight of 620,000.

Carbon black: ISAF grade carbon black having an $N_2SA$ ($m^2/g$) of 112 and a DBP oil absorption (ml/100 g) of 112.

Softening agent: aromatic process oil

|  | Starting rubber latex (parts by weight) | Carbon black (parts by weight) | Softening agent (parts by weight) |
|---|---|---|---|
| Master batch I-9 | 100 | 60 | 34 |

(Note: The amounts of starting rubber latex are amounts converted into solid contents.)

Other Ingredients

SBR I-1: a 50.0 phr oil extended emulsion polymerized styrene-butadiene copolymer rubber having a styrene content of 36%, a vinyl content of 16%, a glass transition temperature of −36° C., and a weight average molecular weight of 720,000.

SBR I-2: a 37.5 phr oil extended emulsion polymerized styrene-butadiene copolymer rubber having a styrene content of 25%, a vinyl content of 16%, a glass transition temperature of −51° C., and a weight average molecular weight of 620,000.

SBR I-3; a 50.0 phr oil extended emulsion polymerized styrene-butadiene copolymer rubber having a styrene content of 35%, a vinyl content of 14%, a glass transition temperature of −36° C., and a weight average molecular weight of 820,000.

SBR I-4: a 20.0 phr oil extended emulsion polymerized styrene-butadiene copolymer rubber having a styrene content of 48%, a vinyl content of 13%, a glass transition temperature of −21° C., and a weight average molecular weight of 1,280,000.

IRI-1: isoprene having a glass transition temperature of −63° C. and a weight average molecular weight of 870,000.

cis-BRI-1: cis type butadiene copolymer rubber having a glass transition temperature of −106° C. and a weight average molecular weight of 650,000.

Carbon black I-1: ISAF grade carbon black having an $N_2SA$ ($m^2/g$) of 112 and a DBP oil absorption (ml/100 g) of 112.

Carbon black I-2: HAF grade carbon black having an $N_2SA$ ($m^2/g$) of 92 and a DBP oil absorption (ml/100 g) of 117.

Carbon black I-3: HAF grade carbon black having an $N_2SA$ ($m^2/g$) of 84 and a DBP oil absorption (ml/100 g) of 130.

Carbon black I-4: SAF grade carbon black having an $N_2SA$ ($m^2/g$) of 153 and a DBP oil absorption (ml/100 g) of 127.

Zinc oxide: Zinc White No. 3

Stearic acid: Industrial grade stearic acid

Antioxidant 6C: N-phenyl-N'-(1,3-dimethylbutyl)-p-phenylenediamine

Softening agent: aromatic process oil

Wax: Industrial grade paraffin wax

Powdered sulfur: 5% oil treated powdered sulfur

Vulcanization accelerator NS: N-tert-butyl-2-benzothiazoyl sulfenamide

Vulcanization accelerator CZ: N-cyclohexyl-2-benzothiazyl sulfenamide

Vulcanization accelerator DPG: Diphenyl guanidine

Preparation of Sample

As a first step, the ingredients shown in Table I-1 were mixed in a 1.8 liter hermetic mixer for 3 to 5 minutes and the mixture discharged after reaching 165±5° C. Next, as the final step, a vulcanization accelerator and sulfur were mixed by an 8-inch open roll to obtain a rubber composition. In the case of two-step mixing as a Comparative Example, the first step was to mix the ingredients in a 1.8 liter internal mixer for 3 to 4 minutes and discharge the mixture after reaching 150±5° C., the second step was to mix the mixture with the remaining ingredients in the 1.8 liter internal mixer for 3 to 5 minutes and discharge it after reaching 165±5° C., then the final step was to mix the vulcanization accelerator and sulfur by an open roll to obtain a rubber composition. In the case of one-step mixing, the ingredients other than the vulcanization accelerator and sulfur were mixed in a 1.8 liter internal mixer for 3 to 4 minutes and discharged after reaching 165±5° C. The vulcanization accelerator and sulfur were then mixed in this by an 8-inch open roll to obtain the rubber composition.

The sample composition was vulcanized by pressing in a 15×15×0.2 cm mold at 160° C. for 20 minutes to prepare the desired test piece which was then evaluated as to its vulcanized properties.

The test methods of the vulcanized properties of the compositions obtained in the Examples were as follows:

1) 300% deformation stress and elongation at break: measured according to JIS K 6251 (dumbbell no. 3 shape)

2) tanδ: measured by Rheograph Solid viscoelasticity apparatus made by Toyo Seiki Seisakusho at 20 Hz, initial elongation of 10%, and dynamic stress of 2% (sample width of 5 mm, measured at temperatures of 0° C. and 60° C.)

3) Abrasion resistance: Measured by Lanborne abrasion tester with abrasion loss indicated as index by following method:

Abrasion resistance (index)=((loss at reference test piece)/(loss at test piece))×100

The reference test pieces were Standard Example I-1 in Table I-1 to Table I-2, Standard Example I-6 in Table I-3, and Standard Example I-8 in Table I-4.

TABLE I-1

|  | Standard Ex. I-1 | Standard Ex. I-2 | Standard Ex. I-3 | Ex. I-1 | Ex. I-2 | Ex. I-3 | Comp. Ex. I-1 |
|---|---|---|---|---|---|---|---|
| (First step) | | | | | | | |
| SBR I-1 | 75.00 | 75.00 | 75.00 | 75.00 | 75.00 | 75.00 | 30.00 |
| SBR I-2 | 68.75 | 68.75 | 68.75 | — | — | — | 68.75 |
| Master batch I-1 | — | — | — | 175.00 | — | — | — |
| Master batch I-2 | — | — | — | — | 145.00 | — | — |
| Master batch I-3 | — | — | — | — | — | 125.00 | — |
| Master batch I-4 | — | — | — | — | — | — | — |
| Master batch I-5 | — | — | — | — | — | — | — |
| Carbon black I-1 | 75.00 | 60.00 | 50.00 | — | — | — | 75.00 |
| Carbon black I-2 | — | — | — | — | — | — | — |
| Zinc oxide | 3.00 | 3.00 | 3.00 | 3.00 | 3.00 | 3.00 | 3.00 |
| Stearic acid | 2.00 | 2.00 | 2.00 | 2.00 | 2.00 | 2.00 | 2.00 |
| Antioxidant 6C | 3.00 | 3.00 | 3.00 | 3.00 | 3.00 | 3.00 | 3.00 |
| Paraffin wax | 1.00 | 1.00 | 1.00 | 1.00 | 1.00 | 1.00 | 1.00 |
| Softening agent | 31.15 | 16.25 | 6.25 | — | — | — | 31.25 |
| (Second step) | | | | | | | |
| SBR I-1 | — | — | — | — | — | — | 45.00*1 |
| (Final step) | | | | | | | |
| Powdered sulfur | 1.80 | 1.80 | 1.80 | 1.80 | 1.80 | 1.80 | 1.80 |
| Vulcanization accelerator CZ | 1.80 | 1.80 | 1.80 | 1.80 | 1.80 | 1.80 | 1.80 |
| Vulcanization accelerator DPG | 0.10 | 0.10 | 0.10 | 0.10 | 0.10 | 0.10 | 0.10 |
| - Vulcanized properties - | | | | | | | |
| 300% deformation stress/MPa | 2.9 | 3.6 | 4.1 | 3.6 | 4.1 | 4.6 | 3.3 |
| Breakage strength/MPa | 13.1 | 15.4 | 16.6 | 15.0 | 18.6 | 19.1 | 16.6 |
| tanδ (0° C.) | 0.524 | 0.450 | 0.423 | 0.591 | 0.523 | 0.489 | 0.581 |
| tanδ (60° C.) | 0.267 | 0.222 | 0.173 | 0.249 | 0.196 | 0.156 | 0.257 |
| tanδ gradient (0° C./60° C.) | 1.96 | 2.03 | 2.45 | 2.37 | 2.67 | 3.13 | 2.26 |
| Abrasion resistance index | 100 | 115 | 120 | 106 | 128 | 126 | 105 |
| $F_A/F_B$ | — | — | — | 2.00 | 2.00 | 2.00 | 1.43 |
| $F_A$ | — | — | — | 1.50 | 1.20 | 1.00 | 1.07 |
| $F_B$ | 0.75 | 0.60 | 0.50 | 0.75 | 0.60 | 0.50 | 0.75 |
| Mw(A)/Mw(B) | 0.86 | 0.86 | 0.86 | 0.86 | 0.86 | 0.86 | 0.90 |

*1 The value of $F_{MAS}$ in the Comparative Example where the rubber polymer is blended in the second step shows the ratio of the carbon black to the rubber polymer blended in the first step.

TABLE I-2

|  | Comp. Ex. I-2 | Comp. Ex. I-3 | Comp. Ex. I-4 | Standard Ex. I-4 | Standard Ex. I-5 | Ex. I-4 | Ex. I-5 | Comp. Ex. I-5 | Comp. Ex. I-6 |
|---|---|---|---|---|---|---|---|---|---|
| (First step) | | | | | | | | | |
| SBR I-1 | 30.00 | 30.00 | 75.00 | 45.00 | 45.00 | 45.00 | 45.00 | 15.00 | 15.00 |
| SBR I-2 | 68.75 | 68.75 | — | 96.25 | 96.25 | — | — | 96.25 | 96.25 |
| Master batch I-1 | — | — | — | — | — | — | — | — | — |
| Master batch I-2 | — | — | — | — | — | — | — | — | — |
| Master batch I-3 | — | — | — | — | — | — | — | — | — |
| Master batch I-4 | — | — | — | — | — | 205.00 | — | — | — |
| Master batch I-5 | — | — | — | — | — | — | 165.00 | — | — |
| Master batch I-9 | — | — | 97.00 | — | — | — | — | — | — |
| Carbon black I-1 | 60.00 | 50.00 | 45.00 | — | — | — | — | — | — |
| Carbon black I-2 | — | — | — | 85.00 | 65.00 | — | — | 85.00 | 65.00 |
| Zinc oxide | 3.00 | 3.00 | 3.00 | 3.00 | 3.00 | 3.00 | 3.00 | 3.00 | 3.00 |
| Stearic acid | 2.00 | 2.00 | 2.00 | 2.00 | 2.00 | 2.00 | 2.00 | 2.00 | 2.00 |
| Antioxidant 6C | 3.00 | 3.00 | 3.00 | 3.00 | 3.00 | 3.00 | 3.00 | 3.00 | 3.00 |
| Wax | 1.00 | 1.00 | 1.00 | 1.00 | 1.00 | 1.00 | 1.00 | 1.00 | 1.00 |
| Softening agent | 16.25 | 6.25 | 14.15 | 23.75 | 3.75 | — | — | 23.75 | 23.75 |

TABLE I-2-continued

|  | Comp. Ex. I-2 | Comp. Ex. I-3 | Comp. Ex. I-4 | Standard Ex. I-4 | Standard Ex. I-5 | Ex. I-4 | Ex. I-5 | Comp. Ex. I-5 | Comp. Ex. I-6 |
|---|---|---|---|---|---|---|---|---|---|
| (Second step) | | | | | | | | | |
| SBR I-1 | 45.00*1 | 45.00*1 | — | — | — | — | — | 45.00*1 | 45.00*1 |
| (Final step) | | | | | | | | | |
| Powdered sulfur | 1.80 | 1.80 | 1.80 | 1.80 | 1.80 | 1.80 | 1.80 | 1.80 | 1.80 |
| Vulcanization accelerator CZ | 1.80 | 1.80 | 1.80 | 1.80 | 1.80 | 1.80 | 1.80 | 1.80 | 1.80 |
| Vulcanization accelerator DPG | 0.10 | 0.10 | 0.10 | 0.10 | 0.10 | 0.10 | 0.10 | 0.10 | 0.10 |
| - Vulcanized properties - | | | | | | | | | |
| 300% deformation stress/MPa | 3.6 | 4.4 | 3.0 | 6.6 | 7.8 | 6.5 | 7.9 | 6.9 | 8.2 |
| Breakage strength/MPa | 15.4 | 20.7 | 13.0 | 17.2 | 20.3 | 18.0 | 21.1 | 18.0 | 22.2 |
| tanδ (0° C.) | 0.489 | 0.417 | 0.531 | 0.430 | 0.428 | 0.495 | 0.435 | 0.499 | 0.429 |
| tanδ (60° C.) | 0.201 | 0.158 | 0.269 | 0.272 | 0.216 | 0.253 | 0.179 | 0.261 | 0.196 |
| tanδ gradient (0° C./60° C.) | 2.43 | 2.64 | 1.97 | 1.58 | 1.98 | 1.96 | 2.43 | 1.91 | 2.19 |
| Abrasion resistance index | 112 | 117 | 105 | 101 | 113 | 105 | 119 | 102 | 114 |
| $F_A/F_B$ | 1.43 | 1.43 | 0.80 | — | — | 1.43 | 1.43 | 1.43 | 1.43 |
| $F_A$ | 0.86 | 0.71 | 0.60 | — | — | 1.21 | 0.93 | 1.21 | 0.93 |
| $F_B$ | 0.60 | 0.50 | 0.75 | 0.85 | 0.65 | 0.85 | 0.65 | 0.85 | 0.65 |
| Mw(A)/Mw(B) | 0.90 | 0.90 | 0.86 | 0.86 | 0.86 | 0.86 | 0.86 | 0.86 | 0.86 |

*1 The value of $F_{MAS}$ in the Comparative Example where the rubber polymer is blended in the second step shows the ratio of the carbon black to the rubber polymer blended in the first step.

TABLE I-3

|  | Standard Ex. I-6 | Standard Ex. I-7 | Ex. I-6 | Ex. I-7 | Comp. Ex. I-7 |
|---|---|---|---|---|---|
| (First step) | | | | | |
| IR I-1 | 50.00 | 50.00 | — | — | 50.00 |
| cis-BR I-1 | — | 20.00 | — | — | — |
| SBR I-3 | 75.00 | 45.00 | 75.00 | 45.00 | 45.00 |
| Master batch I-6 | — | — | 110.00 | — | — |
| Master batch I-7 | — | — | — | 130.00 | — |
| Carbon black I-3 | 50.00 | 50.00 | — | — | 50.00 |
| Zinc oxide | 3.00 | 3.00 | 3.00 | 3.00 | 3.00 |
| Stearic acid | 2.00 | 2.00 | 2.00 | 2.00 | 2.00 |
| Antioxidant 6C | 3.00 | 3.00 | 3.00 | 3.00 | 3.00 |
| Softening agent | 10.00 | 10.00 | — | — | 10.00 |
| (Second step) | | | | | |
| SBR I-3 | — | — | — | — | 30.00*1 |
| (Final step) | | | | | |
| Powdered sulfur | 1.50 | 1.50 | 1.50 | 1.50 | 1.50 |
| Vulcanization accelerator NS | 1.00 | 1.00 | 1.00 | 1.00 | 1.00 |
| - Vulcanized properties - | | | | | |
| 300% deformation stress (MPa) | 10.3 | 11.9 | 10.8 | 12.9 | 11.9 |
| Breakage strength (MPa) | 18.5 | 19.9 | 19.1 | 22.1 | 21.3 |
| tanδ (0° C.) | 0.521 | 0.452 | 0.552 | 0.489 | 0.533 |
| tanδ (60° C.) | 0.206 | 0.172 | 0.173 | 0.153 | 0.191 |
| tanδ gradient (0° C./60° C.) | 2.53 | 2.63 | 3.19 | 3.20 | 2.79 |
| Abrasion resistance index | 100 | 115 | 105 | 117 | 103 |
| $F_A/F_B$ | — | — | 2.00 | 1.44 | 1.25 |
| $F_A$ | — | — | 1.00 | 0.72 | 0.63 |
| $F_B$ | 0.50 | 0.50 | 0.50 | 0.50 | 0.50 |
| Mw(A)/Mw(B) | 1.06 | 0.98 | 1.06 | 0.98 | 1.04 |

*1 The value of $F_{MAS}$ in the Comparative Example where the rubber polymer is blended in the second step shows the ratio of the carbon black to the rubber polymer blended in the first step.

TABLE I-4

|  | Standard Ex. I-8 | Ex. I-8 | Comp. Ex. I-7 |
|---|---|---|---|
| (First step) | | | |
| SBR I-3 | 90.00 | — | 90.00 |
| SBR I-4 | 48.00 | 48.00 | 8.00 |
| Master batch I-8 | — | 195.00 | — |
| Carbon black I-4 | 95.00 | — | 95.00 |
| Zinc oxide | 3.00 | 3.00 | 3.00 |
| Stearic acid | 2.00 | 2.00 | 2.00 |
| Antioxidant 6C | 3.00 | 3.00 | 3.00 |
| Softening agent | 22.00 | — | 22.00 |
| (Second step) | | | |
| SBR I-4 | — | — | 40.00*1 |
| (Final step) | | | |
| Powdered sulfur | 1.90 | 1.90 | 1.90 |
| Vulcanization accelerator CZ | 1.90 | 1.90 | 1.90 |
| Vulcanization accelerator DPG | 0.10 | 0.10 | 0.10 |
| - Vulcanized properties - | | | |
| 300% deformation stress (MPa) | 9.3 | 11.9 | 10.8 |
| Breakage strength (MPa) | 20.1 | 19.9 | 19.1 |
| tanδ (0° C.) | 0.811 | 0.987 | 0.962 |
| tanδ (60° C.) | 0.512 | 0.442 | 0.467 |
| tanδ gradient (0° C./60° C.) | 1.58 | 2.23 | 2.06 |
| Abrasion resistance index | 100 | 115 | 105 |
| $F_A/F_B$ | — | 1.67 | 1.5 |
| $F_A$ | — | 1.58 | 1.43 |
| $F_B$ | 0.25 | 0.95 | 0.95 |
| Mw(A)/Mw(B) | 0.64 | 0.64 | 0.68 |

*1 The value of $F_{MAS}$ in the Comparative Example where the rubber polymer is blended in the second step shows the ratio of the carbon black to the rubber polymer blended in the first step.

Example II-1

Method of Producing of Starting Rubber A'

A stainless steel polymerization reactor of an inner capacity of 3 liters was washed, dried, and filled with dry nitrogen. 800 g of toluene, 1 mmole of tetramethylethylenediamine, and 125 mmole of n-butyl lithium (n-hexane solution) were added to this and stirred at 70° C. The system was held at 70°

C. and 150 g of 1,3-butadiene were continuously added with stirring into the system over 4 hours. After confirming that the polymerization of the butadiene had in fact ended, 27 g of styrene was continuously added with stirring into the reaction system over 30 minutes. After confirming that the polymerization of the styrene had in fact ended, 150 mmole of N-methyl-2-pyrrolidone was immediately added and the reaction allowed to proceed for 45 minutes with stirring. Next, 125 mmole of isopropyl alcohol was added to stop the reaction. The resultant polymerized reaction product was taken out into a container under a nitrogen atmosphere.

The above polymer was transferred into a 2.0% by weight methanol solution of 2,6-di-t-butyl-p-cresol to cause it to coagulate, then was dried at 60° C. for 24 hours under reduced pressure. The glass transition temperature was measured using a differential scanning calorimeter (DSC). The amount of the bound styrene and the amount of the vinyl bonds were found using an infrared spectrophotometer (Hampton, Anal. Chem., 21, 923 (1949)). The glass transition temperature was −30° C., the amount of bound styrene was 20%, the amount of vinyl bonds was 65%, and the weight average molecular weight converted into standard polystyrene and measured by GPC was 310,000. Further, the presence of the functional groups of formula (I) was confirmed by a 290 nm ultraviolet absorption spectrum.

Method of Producing Starting Rubber B'

1,3-butadiene monomer and styrene monomer were emulsified and dispersed in an aqueous medium using a mixed emulsifying agent of a fatty acid soap and resin acid soap. The polymerization was performed using a combination of a polymerization initiator p-methane hydroperoxide and ferrous silver nitrate and, as a reducing agent, sodium formaldehyde sulfoxylate, at under 10° C. so as to obtain an emulsion polymerized styrene-butadiene polymer of a glass transition temperature of −21° C. and amount of bound styrene of 45%.

Mixing Method 15 g of carbon black (nitrogen specific area of 150 m$^2$/g and DBP oil absorption of 127 ml/100 g) was placed in 100 ml of water in a 1000 cc beaker and 300 ml of toluene or another solvent was added. An ultrasonic washer etc. was used to disperse the carbon black in the solvent homogeneously. 10 g of the resultant polymer was dissolved in 300 ml of the solvent in advance and carbon black dispersed in the same. This was mixed and stirred at room temperature in a nitrogen atmosphere using a stirrer etc. for approximately 20 minutes. Next, 5 g of emulsion polymerized styrene-butadiene polymer was dissolved as the starting rubber B in 300 ml of solvent. This was added to the carbon black/polymer mixture previously mixed and stirred at room temperature in a nitrogen atmosphere and mixed and stirred for about 5 minutes, then the mixture was transferred to a 2.0% methanol solution of 2,6-di-t-butyl-p-cresol to be coagulated and dried at 60° C. for 24 hours under reduced pressure. (This was used as the Master Batch II-1.)

Example II-2

Starting Rubber A'

Tetramethylethylene diamine and n-butyl lithium (n-hexane solution) were added into toluene and stirred at 70° C. While holding the system at 70° C., 100 g of 1,3-butadiene was continuously added into the system with stirring. After confirming that the polymerization of the butadiene had in fact ended, 18 g of styrene was continuously added into the reaction system over 30 minutes with stirring. After confirming that the polymerization of the styrene had in fact ended, stannous tetrachloride and then N-methyl-2-pyrrolidone were added immediately to cause a reaction, with stirring. Next, isopropyl alcohol was added to stop the reaction, then the mixture was transferred into a 2.0% methanol solution of 2,6-di-t-butyl-p-cresol to cause coagulation, then was dried at 60° C. for 24 hours to obtain a terminal modified/coupled solution polymerized styrene-butadiene copolymer having a glass transition temperature of −30° C., an amount of bound styrene of 20%, and an amount of vinyl bonds of 65%.

Method of Producing Stock Rubber B'

1,3-butadiene monomer and styrene monomer were emulsified and dispersed in an aqueous medium using a mixed emulsifying agent of a fatty acid soap and resin acid soap. The polymerization was performed using a combination of a polymerization initiator p-methane hydroperoxide and silver nitrate-ferric nitrate and, as a reducing agent, sodium formaldehyde sulfoxylate, at under 10° C. so as to obtain an emulsion polymerized styrene-butadiene polymer having a glass transition temperature of −36° C. and an amount of bound styrene of 35%.

Mixing Method 15 g of carbon black (nitrogen specific area of 150 m$^2$/g and DBP oil absorption of 127 ml/100 g) was placed in 100 ml of water in a 1000 cc beaker and 100 ml of toluene or another solvent was added. An ultrasonic washer etc. was used to disperse the carbon black in the solvent homogeneously. 10 g of the resultant stock rubber A' was dissolved in 300 ml of the solvent in advance and carbon black dispersed in the same. This was mixed and stirred at room temperature in a nitrogen atmosphere using a stirrer etc. for approximately 20 minutes. Next, 5 g of emulsion polymerized styrene-butadiene polymer was dissolved as the starting rubber B' in 300 ml of solvent. This was added to the carbon black/polymer mixture previously mixed and stirred at room temperature in a nitrogen atmosphere and mixed and stirred for about 5 minutes, then the mixture was transferred to a 2.0% methanol solution of 2,6-di-t-butyl-p-cresol to be coagulated and dried at 60° C. for 24 hours under reduced pressure. (This was used as the Master Batch II-2.)

Example II-3

Starting Rubber A'

1,3-butadiene monomer was emulsified and dispersed in an aqueous medium using a mixed emulsifying agent of a fatty acid soap and resin acid soap. The polymerization was performed using a combination of a polymerization initiator p-methane hydroperoxide and silver nitrate-ferric nitrate and, as a reducing agent, sodium formaldehyde sulfoxylate, at under 10° C. so as to obtain a cis-type butadiene polymer of a glass transition temperature of −102° C.

Method of Producing Starting Rubber B'

Natural methylethylenediamine and n-butyl lithium (n-hexane solution) were added into toluene and stirred at 70° C. While holding the system at 70° C., 100 g of 1,3-butadiene was continuously added into the system with stirring. After confirming that the polymerization of the butadiene had in fact ended, 18 g of styrene was continuously added into the reaction system over 30 minutes with stirring. After confirming that the polymerization of the styrene had in fact ended, N-methyl-2-pyrrolidone was added immediately to cause a reaction, with stirring. Next, isopropyl alcohol was added to stop the reaction, then the mixture was transferred into a 2.0% methanol solution of 2,6-di-t-butyl-p-cresol to cause coagulation, then was dried at 60° C. for 24 hours to obtain a terminal modified/coupled solution polymerized styrene-butadiene copolymer having a glass transition temperature of −30° C., an amount of bound styrene of 20%, and an amount of vinyl bonds of 65%.

Mixing Method 8 g of carbon black (nitrogen specific area of 92 m$^2$/g and DBP oil absorption of 117 ml/100 g) was placed in 100 ml of water in a 1000 cc beaker and 100 ml of toluene or another solvent was added. An ultrasonic washer etc. was used to disperse the carbon black in the solvent homogeneously. 6 g of the resultant starting rubber A' was dissolved in 200 ml of the solvent in advance and carbon black dispersed in the same. This was mixed and stirred at room temperature in a nitrogen atmosphere using a stirrer etc. for approximately 20 minutes. Next, 10 g of emulsion polymerized styrene-butadiene polymer was dissolved as the starting rubber B' in 300 ml of solvent. This was added to the carbon black/polymer mixture previously mixed and stirred at room temperature in a nitrogen atmosphere and mixed and stirred for about 5 minutes, then the mixture was transferred to a 2.0% methanol solution of 2,6-di-t-butyl-p-cresol to be coagulated and dried at 60° C. for 24 hours under reduced pressure. (This was used as the Master Batch II-3.)

Example II-4

Starting Rubber A'

As starting rubber A', an emulsion polymerized styrene-butadiene copolymer latex having a glass transition temperature of −51° C., an amount of bound styrene of 25%, and an amount of vinyl bonds of 15% was used.

Starting Rubber B'

As starting rubber B', an emulsion polymerized styrene-butadiene copolymer latex having a glass transition temperature of −36° C., an amount of bound styrene of 38%, and an amount of vinyl bonds of 15% was used.

Mixing Method 9 g of carbon black (nitrogen specific area of 117 m$^2$/g and DBP oil absorption of 112 ml/100 g) was placed in 100 ml of water in a 1000 cc beaker to prepare an aqueous dispersion (slurry). 5 g of the resultant starting rubber A' latex and the aqueous dispersion (slurry) were mixed and stirred at room temperature in a nitrogen atmosphere using a stirrer etc. for approximately 20 minutes, then acid was added to coagulate it. Next, 5 g of the starting rubber B' latex was added to the mixture previously mixed and stirred at room temperature in a nitrogen atmosphere, mixed and stirred for about 5 minutes, then acid was added to coagulate it. After coagulation, the mixture was dried at 80° C. for 24 hours under reduced pressure to obtain the desired master batch. The acid used as the coagulant was sulfuric acid. The pH of the mixed solution was adjusted to 10 to 3 to 4. (This was used as the Master Batch II-4.)

Example II-5

Starting Rubber A'

As starting rubber A', a natural rubber having a glass transition temperature of −70° C. was used.

Starting Rubber B'

As starting rubber B', an emulsion polymerized styrene-butadiene copolymer latex having a glass transition temperature of −31° C., an amount of bound styrene of 38%, and an amount of vinyl bonds of 15% was used.

Mixing Method 5 g of carbon black (nitrogen specific area of 92 m$^2$/g and DBP oil absorption of 117 ml/100 g) was placed in 100 ml of water in a 1000 cc beaker to prepare an aqueous dispersion (slurry). 6 g of the resultant starting rubber A' latex and the aqueous dispersion (slurry) were mixed and stirred at room temperature in a nitrogen atmosphere using a stirrer etc. for approximately 20 minutes, then acid was added to coagulate it. Next, 4 g of the starting rubber B' latex was added to the mixture previously mixed and stirred at room temperature in a nitrogen atmosphere, mixed and stirred for about 5 minutes, then acid was added to coagulate it. After coagulation, the mixture was dried at 80° C. for 24 hours under reduced pressure to obtain the desired master batch. The acid used as the coagulant was sulfuric acid. The pH of the mixed solution was adjusted to 10 to 3 to 4. (This was used as the Master Batch II-5.)

The apparatuses used for detection of the glass transition temperature, the polymer microstructure, the molecular weight, and the existence of a functional group in formula (I) were as follows:

DSC: Thermal analyzer 1090B made by Du Pont.

IR: Infrared spectroanalyzer 983G made by Perkins-Elmer.

HLC: HLC-8020 made by Toso.

Column: G-600 HXL, G-5000HXL, G-4000HXL, G-3000HXL, G-2000HXL (solvent: THF used) made by Toso.

UV: Spectrophotometer U-3300 made by Hitachi Ltd.

Example II-6

Starting Rubber A'

As starting rubber A', an emulsion polymerized styrene-butadiene copolymer latex having a glass transition temperature of −51° C., an amount of bound styrene of 25%, and an amount of vinyl bonds of 15% was used.

Starting Rubber B'

As starting rubber B', a 33.3% oil extended emulsion polymerized styrene-butadiene copolymer rubber having a glass transition temperature of −31° C., an amount of bound styrene of 38%, and an amount of vinyl bonds of 15% was used.

Mixing Method 7 g of carbon black (nitrogen specific area of 92 m$^2$/g and DBP oil absorption of 117 ml/100 g) was placed in 100 ml of water in a 1000 cc beaker to prepare an aqueous dispersion (slurry). 7 g of the resultant polymer A' was mixed and stirred at room temperature in a nitrogen atmosphere using a stirrer etc. for approximately 20 minutes, acid was added to coagulate it, then the result was dried at 80° C. for 24 hours under reduced pressure. The acid used as the coagulant was sulfuric acid. The pH of the mixed solution was adjusted to 10 to 3 to 4. The rubber composition containing carbon black obtained at this time was used as the Master Batch II-6. 840 g of a rubber composition containing carbon black obtained by repeating the above method 60 times and 270 g of the B group stock rubber were mixed by a 1.8 liter hermetic mixer for 3 to 5 minutes and the result discharged after reaching 150±5° C. The rubber composition containing carbon black obtained at this time was used as the Master Batch II-7.

Examples of Evaluation of Formulation

The other ingredients used for the formulations of the Standard Examples and Examples were as follows:

Natural rubber (NR) II-1: RSS#1

SBR II-1: a terminal modified/coupled solution polymerized styrene-butadiene copolymer having a glass transition temperature of −30° C., a molecular weight of 360,000, an amount of bound styrene of 20%, and an amount of vinyl bonds of 65%

SBR II-2: a 33.3% oil extended emulsion polymerized styrene-butadiene copolymer having a glass transition temperature of −21° C., a molecular weight of 1,300,000, and an amount of bound styrene of 45%.

SBR II-3: a 33.3% oil extended emulsion polymerized styrene-butadiene copolymer having a glass transition temperature of −36° C., a molecular weight of 820,000, and an amount of bound styrene of 35%.

SBR II-4: a 33.3% oil extended emulsion polymerized styrene-butadiene copolymer having a glass transition temperature of −36° C., a molecular weight of 720,000, an amount of bound styrene of 38% and an amount of vinyl bonds of 15%.

SBR II-5: a 16.6% oil extended emulsion polymerized styrene-butadiene copolymer of a glass transition temperature of −51° C., a molecular weight of 620,000, an amount of bound styrene of 25% and an amount of vinyl content of 15%.

BR II-1: a cis type butadiene copolymer having a glass transition temperature of −102° C. and a molecular weight of 620,000.

Carbon black II-1: nitrogen specific area having 150 m$^2$/g and DBP oil absorption of 127 ml/100 g.

Carbon black II-2: nitrogen specific area having 92 m$^2$/g and DBP oil absorption of 117 ml/100 g.

Carbon black II-3: nitrogen specific area having 117 m$^2$/g and DBP oil absorption of 112 ml/100 g.

Powdered sulfur: 5% oil treated powdered sulfur Antioxidant 6C: N-phenyl-N'-(1,3-dimethylbutyl)-p-phenylenediamine Aromatic oil: aromatic process oil Vulcanization accelerator CZ: N-cyclohexyl-2-benzothiazyl sulfenamide Zinc oxide: Zinc White No. 3

Stearic acid: Industrial grade stearic acid

Preparation of Sample

Regarding the master batch, the starting rubber, carbon, and ingredients other than the vulcanization accelerator and sulfur were mixed in a 1.8 liter internal mixer for 3 to 5 minutes and the resultant mixture discharged when reaching 165±5° C. to form a master batch. The vulcanization accelerator and sulfur were mixed with this by an 8 inch open roll to obtain a rubber composition. In the case of two-step mixing as a Comparative Example, the first step was to mix the ingredients in a 1.8 liter internal mixer for 3 to 4 minutes and discharge the mixture after reaching 150±5° C., the second step was to mix the master batch with the remaining ingredients in the 1.8 liter internal mixer for 3 to 5 minutes and discharge it after reaching 165±5° C., then the final step was to knead the vulcanization accelerator and sulfur with the second step master batch by an open roll to obtain a rubber composition. In the case of one-step mixing, the ingredients other than the vulcanization accelerator and sulfur were mixed in a 1.8 liter internal mixer for 3 to 4 minutes and discharged after reaching 165±5° C. The vulcanization accelerator and sulfur were then mixed in this by an 8-inch open roll to obtain the rubber composition. The unvulcanized properties of the obtained rubber composition was measured.

Next, the composition was vulcanized by pressing in a 15×15×0.2 cm mold at 160° C. for 20 minutes to prepare the desired test piece which was then evaluated as to its vulcanized properties.

The test methods of the unvulcanized properties and vulcanized properties of the compositions obtained in the Examples were as follows:

Unvulcanized Properties

1) The mix scorching time at the time of the first step of mixing, that is, the scorching time when mixing by the mixer was measured at a temperature inside the mixer of 60° C. and a mixing speed of 80 rpm. The measurement was performed by checking by a stopwatch the time after the melt torque rises once, falls, then once again rises when the carbon etc. is incorporated. The test was judged as "no scorching" when the torque did not rise after 10 minutes.

Vulcanized Properties 1) 300% deformation stress and elongation at break: measured according to JIS K 6251 (dumbbell no. 3 shape)

2) tanδ: measured by Rheograph Solid viscoelasticity apparatus made by Toyo Seiki Seisakusho at 20 Hz, initial elongation of 10%, and dynamic stress of 2% (sample width of 5 mm, measured at temperatures of 0° C. and 60° C.)

3) Abrasion resistance: Measured by Lanborne abrasion tester with abrasion loss indicated as index by following method:

Abrasion resistance (index)=((loss at reference test piece)/(loss at test piece))×100

The reference test pieces were Standard Examples 1, 5, 7, 11, 14, 18, 22, and 26 in Tables II-1 to II-3.

Examples II-1 to II-6

Examples in Master Batch II-1 (Examples II-3, II-4, and II-6) and Standard Examples of Formulations Close to Master Batch II-1 (Examples II-1, II-2, and II-5)

These show Examples of use of Master Batch II-1. The polymers used in the Standard Examples, however, were close in content to the polymer contained in the Master Batch II-1. The results are shown in Table II-1.

TABLE II-1

|  | Ex. II-1[*1] | Ex. II-2[*1] | Ex. II-3[*2] | Ex. II-4[*1] | Ex. II-5[*1] | Ex. II-6[*2] |
| --- | --- | --- | --- | --- | --- | --- |
| (First step) | | | | | | |
| SBR II-1 | 40.0 | 40.0 | — | 40.0 | 40.0 | — |
| SBR II-2 | 90.0 | 30.0 | 60.0 | 30.0 | 30.0 | — |
| SBR II-3 | — | — | — | 60.0 | — | 60.0 |
| Master batch II-1 | — | — | 120.0 | — | — | 120.0 |
| Carbon black II-1 | 60.0 | 60.0 | — | 60.0 | 60.0 | — |
| Zinc oxide | 3.0 | 3.0 | 3.0 | 3.0 | 3.0 | 3.0 |
| Stearic acid | 2.0 | 2.0 | 2.0 | 2.0 | 2.0 | 2.0 |
| Antioxidant 6C | 5.0 | 5.0 | 5.0 | 5.0 | 5.0 | 5.0 |
| Aromatic oil | 30.0 | 30.0 | 40.0 | 30.0 | 30.0 | 40.0 |
| Powdered sulfur | 2.0 | 2.0 | 2.0 | 2.0 | 2.0 | 2.0 |
| Vulcanization accelerator CZ | 2.0 | 2.0 | 2.0 | 2.0 | 2.0 | 2.0 |
| (Second step) | | | | | | |
| SBR II-2 | — | 60.0 | — | — | — | — |
| SBR II-3 | — | — | — | — | 60.0 | — |
| - Nonvulcanized properties - | | | | | | |
| Mixing scorching time (min) | No scorching | 7.0 | No scorching | No scorching | 7.5 | No scorching |
| - Vulcanized properties - | | | | | | |
| 300% deformation stress (MPa) | 7.1 | 7.3 | 7.0 | 7.2 | 8.2 | 10.5 |
| Breakage strength (MPa) | 16.7 | 16.9 | 16.5 | 16.9 | 18.1 | 17.9 |
| tan$\delta$ (0° C.) | 1.041 | 1.102 | 1.161 | 0.941 | 1.162 | 1.018 |
| tan$\delta$ (60° C.) | 0.353 | 0.318 | 0.306 | 0.332 | 0.310 | 0.301 |
| tan$\delta$ gradient (0° C./60° C.) | 2.95 | 3.47 | 3.79 | 2.83 | 3.75 | 3.38 |
| Abrasion resistance index | 100 | 106 | 103 | 100 | 102 | 103 |

[*1]Standard Examples.
[*2]Examples.

Examples II-7 to II-13

Examples of Master Batches II-1 and II-2 (Examples II-9, II-10, II-12, II-13) and Standard Examples of Formulations Close to Master Batches II-1 and II-2 (Examples II-7, II-8, and II-11)

These show examples of use of Master Batches II-1 and II-2. The polymers used for the Standard Examples are close to the content of the polymers contained in Master Batch II-1. The results are shown in Table II-2.

TABLE II-2

|  | Ex. II-7[*1] | Ex. II-8[*1] | Ex. II-9[*2] | Ex. II-10[*2] | Ex. II-11[*1] | Ex. II-12[*2] | Ex. II-13[*2] |
| --- | --- | --- | --- | --- | --- | --- | --- |
| (First step) | | | | | | | |
| SBR II-1 | 50.0 | 50.0 | — | — | 50.0 | — | — |
| SBR II-2 | 75.0 | 37.5 | 37.5 | 37.5 | 37.5 | 37.5 | 37.5 |
| Master batch II-1 | — | — | 150.0 | — | — | 150.0 | — |
| Master batch II-2 | — | — | — | 150.0 | — | — | 150.0 |
| Carbon black II-1 | 75.0 | 75.0 | — | — | 95.0 | 20.0 | 20.0 |
| Zinc oxide | 3.0 | 3.0 | 3.0 | 3.0 | 3.0 | 3.0 | 3.0 |
| Stearic acid | 2.0 | 2.0 | 2.0 | 2.0 | 2.0 | 2.0 | 2.0 |
| Antioxidant 6C | 5.0 | 5.0 | 5.0 | 5.0 | 5.0 | 5.0 | 5.0 |
| Aromatic oil | 30.0 | 30.0 | 42.5 | 30.0 | 40.0 | 52.5 | 52.5 |
| Powdered sulfur | 2.0 | 2.0 | 2.0 | 2.0 | 2.0 | 2.0 | 2.0 |
| Vulcanization accelerator CZ | 2.0 | 2.0 | 2.0 | 2.0 | 2.0 | 2.0 | 2.0 |
| (Second step) | | | | | | | |
| SBR II-2 | — | 37.5 | — | — | 37.5 | — | — |
| - Nonvulcanized properties - | | | | | | | |
| Mixing scorching time (min) | No scorching | 6.0 | No scorching | No scorching | 5.0 | No scorching | No scorching |
| - Vulcanized properties - | | | | | | | |
| 300% deformation stress (MPa) | 7.8 | 7.7 | 7.6 | 7.8 | 8.9 | 8.7 | 10.5 |
| Breakage strength (MPa) | 17.8 | 18.0 | 18.1 | 17.8 | 19.8 | 19.5 | 19.6 |
| tan$\delta$ (0° C.) | 0.831 | 0.922 | 0.933 | 0.931 | 0.799 | 0.982 | 0.987 |

TABLE II-2-continued

|  | Ex. II-7*1 | Ex. II-8*1 | Ex. II-9*2 | Ex. II-10*2 | Ex. II-11*1 | Ex. II-12*2 | Ex. II-13*2 |
|---|---|---|---|---|---|---|---|
| tanδ (60° C.) | 0.471 | 0.452 | 0.443 | 0.447 | 0.455 | 0.431 | 0.427 |
| tanδ gradient (0° C./60° C.) | 1.76 | 2.04 | 2.11 | 2.08 | 1.76 | 2.28 | 2.31 |
| Abrasion resistance index | 100 | 105 | 101 | 103 | 100 | 102 | 104 |

*1Standard Examples.
*2Examples.

Examples II-14 to II-17

Example of Master Batch II-3 (Example II-17) and Standard Examples of Formulations Close to Master Batch II-3 (Examples II-14 to II-16)

These show examples of use of Master Batch II-3. The polymers used for the Standard Examples are close to the content of the polymer contained in Master Batch II-1. The results are shown in Table II-3.

TABLE II-3

|  | Ex. II-14*1 | Ex. II-15*1 | Ex. II-16*1 | Ex. II-17*2 |
|---|---|---|---|---|
| (First step) |  |  |  |  |
| SBR II-1 | 62.5 | — | 32.5 | — |
| BR II-1 | 37.5 | 37.5 | 37.5 | — |
| Master batch II-3 | — | — | — | 150.0 |
| Carbon black II-2 | 50.0 | 50.0 | 50.0 | — |
| Zinc oxide | 3.0 | 3.0 | 3.0 | 3.0 |
| Stearic acid | 2.0 | 2.0 | 2.0 | 2.0 |
| Antioxidant 6C | 5.0 | 5.0 | 5.0 | 5.0 |
| Aromatic oil | 10.0 | 10.0 | 10.0 | 10.0 |
| Powdered sulfur | 2.0 | 2.0 | 2.0 | 2.0 |
| Vulcanization accelerator CZ | 2.0 | 2.0 | 2.0 | 2.0 |
| (Second step) |  |  |  |  |
| SBR (II-1) - Nonvulcanized properties - | — | 62.5 | 30.0 | — |
| Mixing scorching time (min) | No scorching | 4.0 | No scorching | No scorching |
| - Vulcanized properties - |  |  |  |  |
| 300% deformation stress (MPa) | 11.9 | None | 11.1 | 10.8 |
| Breakage strength (MPa) | 15.1 | None | 15.2 | 15.8 |
| tanδ (0° C.) | 0.284 | None | 0.298 | 0.310 |
| tanδ (60° C.) | 0.126 | None | 0.111 | 0.101 |
| tanδ gradient (0° C./60° C.) | 2.25 | None | 2.68 | 3.07 |
| Abrasion resistance index | 100 | None | 102 | 101 |

*1Standard Examples.
*2Examples.

TABLE II-4

|  | Ex. II-18*1 | Ex. II-19*1 | Ex. II-20*1 | Ex. II-21*2 |
|---|---|---|---|---|
| (First step) |  |  |  |  |
| SBR II-4 | 75.0 | — | 30.0 | — |
| BR II-5 | 60.0 | 60.0 | 60.0 | — |
| Master batch II-4 | — | — | — | 190.0 |
| Carbon black II-2 | 90.0 | 90.0 | 90.0 | — |
| Zinc oxide | 3.0 | 3.0 | 3.0 | 3.0 |
| Stearic acid | 2.0 | 2.0 | 2.0 | 2.0 |
| Antioxidant 6C | 3.0 | 3.0 | 3.0 | 3.0 |
| Aromatic oil | 15.0 | 15.0 | 15.0 | 50.0 |
| Powdered sulfur | 2.0 | 2.0 | 2.0 | 2.0 |
| Vulcanization accelerator CZ (Second step) | 2.0 | 2.0 | 2.0 | 2.0 |
| SBR (II-4) - Nonvulcanized properties - | — | 75.0 | 45.0 | — |
| Mixing scorching time (min) | No scorching | 4.3 | No scorching | No scorching |
| - Vulcanized properties - |  |  |  |  |
| 300% deformation stress (MPa) | 11.1 | None | 12.9 | 12.5 |
| Breakage strength (MPa) | 19.6 | None | 20.1 | 20.4 |
| tanδ (0° C.) | 0.687 | None | 0.681 | 0.721 |
| tanδ (60° C.) | 0.421 | None | 0.373 | 0.365 |
| tanδ gradient (0° C./60° C.) | 1.63 | None | 1.83 | 1.98 |
| Abrasion resistance index | 100 | None | 111 | 115 |

*1Standard Examples.
*2Examples.

Example of Master Batch II-4 (Example II-21) and Standard Examples of Formulations Close to Master Batch II-4 (Examples II-18 to II-20)

These show examples to use of Master Batch II-3. The polymers used for the Standard Examples are close to the content of the polymer contained in Master Batch II-1.

TABLE II-5

|  | Ex. II-22*1 | Ex. II-23*1 | Ex. II-24*1 | Ex. II-25*2 |
|---|---|---|---|---|
| (First step) |  |  |  |  |
| NBR II-1 | 60.0 | 60.0 | 60.0 | — |
| SBR II-4 | 60.0 | — | 30.0 | — |
| Master batch II-5 | — | — | — | 150.0 |
| Carbon black II-3 | 50.0 | 50.0 | 50.0 | — |
| Zinc oxide | 3.0 | 3.0 | 3.0 | 3.0 |
| Stearic acid | 2.0 | 2.0 | 2.0 | 2.0 |
| Antioxidant 6C | 3.0 | 3.0 | 3.0 | 3.0 |
| Aromatic oil | 5.0 | 5.0 | 5.0 | 25.0 |
| Powdered sulfur | 2.0 | 2.0 | 2.0 | 2.0 |
| Vulcanization accelerator CZ (Second step) | 2.0 | 2.0 | 2.0 | 2.0 |
| SBR II-4 - Nonvulcanized properties - | — | 60.0 | 30.0 | — |
| Mixing scorching time (min) | No scorching | 3.5 | No scorching | No scorching |
| - Vulcanized properties - |  |  |  |  |
| 300% deformation stress (MPa) | 12.1 | None | 12.9 | 12.8 |

TABLE II-5-continued

|  | Ex. II-22*1 | Ex. II-23*1 | Ex. II-24*1 | Ex. II-25*2 |
|---|---|---|---|---|
| Breakage strength (MPa) | 23.7 | None | 22.9 | 23.5 |
| tanδ (0° C.) | 0.523 | None | 0.533 | 0.541 |
| tanδ (60° C.) | 0.191 | None | 0.183 | 0.178 |
| tanδ gradient (0° C./60° C.) | 2.74 | None | 2.91 | 3.04 |
| Abrasion resistance index | 100 | None | 109 | 111 |

*1Standard Examples.
*2Examples.

Example of Master Batch II-5 (Example II-25) and Standard Examples of Formulations Close to Master Batch II-5 (Examples II-22 to II-24)

These show examples of use of Master Batch II-5. The polymers used for the Standard Examples are close to the content of the polymer contained in Master Batch II-5.

Standard Examples (Examples II-26, II-27, and II-28) and Examples (Examples II-29 and II-30)

Table II-6 shows examples of SBR II-4 (glass transition temperature −36° C., bound styrene 38%, vinyl bonds 15%, weight average molecular weight 720,000 emulsion polymerized styrene-butadiene copolymer) and SBR 5 (glass transition temperature −51° C., bound styrene 25%, vinyl bonds 15%, weight average molecular weight 620,000 emulsion polymerized styrene-butadiene copolymer). The results are shown in Table II-6.

TABLE II-6

|  | Ex. II-26*1 | Ex. II-27*1 | Ex. II-28*1 | Ex. II-29*2 | Ex. II-30*2 |
|---|---|---|---|---|---|
| (First step) |  |  |  |  |  |
| SBR II-4 | 45.0 | 25.0 | — | 45.0 | — |
| SBR II-5 | 84.0 | 84.0 | 84.0 | — | — |
| Master batch II-6 | — | — | — | 140.0 | — |
| Master batch II-7 | — | — | — | — | 185.0 |
| Carbon black II-2 | 70.0 | 70.0 | 70.0 | — | — |
| Zinc oxide | 3.0 | 3.0 | 3.0 | 3.0 | 3.0 |
| Stearic acid | 2.0 | 2.0 | 2.0 | 2.0 | 2.0 |
| Antioxidant 6C | 3.0 | 3.0 | 3.0 | 3.0 | 3.0 |
| Aromatic oil | 6.0 | 6.0 | 6.0 | 20.0 | 20.0 |
| Powdered sulfur | 2.0 | 2.0 | 2.0 | 2.0 | 2.0 |
| Vulcanization accelerator CZ | 2.0 | 2.0 | 2.0 | 2.0 | 2.0 |
| (Second step) |  |  |  |  |  |
| SBR II-4 | — | 20.0 | 45.0 | — | — |
| - Nonvulcanized properties - |  |  |  |  |  |
| Mixing scorching time (min) | No scorching | No scorching | 8.5 | No scorching | No scorching |
| - Vulcanized properties - |  |  |  |  |  |
| 300% deformation stress (MPa) | 9.2 | 9.3 | 9.5 | 9.7 | 9.6 |
| Breakage strength (MPa) | 22.3 | 21.9 | 22.1 | 22.2 | 22.5 |
| tanδ (0° C.) | 0.511 | 0.510 | 0.521 | 0.522 | 0.523 |
| tanδ (60° C.) | 0.263 | 0.260 | 0.231 | 0.221 | 0.220 |
| tanδ gradient (0° C./60° C.) | 100 | 101 | 108 | 112 | 115 |
| Abrasion resistance index |  |  |  |  |  |

*1Standard Examples.
*2Examples.

We claim:

1. A rubber composition comprising:
   (i) a carbon black-containing rubber composition obtained by coagulating, dehydrating, and drying a rubber latex mixture containing 50 to 90 parts by weight, in terms of solid components, of latex of at least one starting rubber A having an average glass transition temperature TgA of −120° C. to −15° C., 40 to 100 parts by weight of carbon black, and 70 parts by weight or less of a softening agent, and
   (ii) a starting rubber B having an average glass transition temperature TgB in the relationship of TgA+10 (°C.) ≦TgB, said starting rubbers A and B being present in the rubber composition in an amount such that the total amount of the starting rubbers A and B is 100 parts by weight, and optionally a softening agent in an amount such that the total amount of softening agent in the rubber composition is 80 parts by weight or less,
   the carbon black-containing rubber composition (i) being mixed with the starting rubber B (ii) in an internal mixer, and at a ratio $F_A/F_B$ of from 1.2 to 3.0, wherein $F_A$ is a concentration of the carbon black in the starting rubber A and $F_B$ is a concentration of the carbon black in the total amount or rubbers A and B.

2. The rubber composition of claim 1, wherein the weight average molecular weight Mw(A) of starting rubber A is from 100,000 to 1,200,000, the weight average molecular weight Mw(B) of starting rubber B is at least 200,000, and $0.1 \leq Mw(A)/Mw(B) \leq 6.0$.

3. The rubber composition of claim 1, wherein the nitrogen specific surface area ($N_2SA$) of the carbon black is from 50 to 200 m²g and the DBP oil absorption is 60 to 140 ml/100 g.

4. The rubber composition of claim 1, wherein starting rubber B is a styrene-butadiene copolymer rubber obtained by solution polymerization and/or emulsion polymerization.

5. A pneumatic tire having a cap tread portion comprising the rubber composition of claim 1.

6. The pneumatic tire of claim 5, wherein the tanδ (0° C.) of the rubber composition is 0.4 or more and the tanδ (60° C.) is 0.1 or more.

7. A carbon black-containing rubber composition prepared using starting rubbers dissolved in an organic solvent or made into an aqueous emulsion, comprising a starting rubber A' containing a polymer having functional groups represented by formula (I):

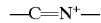

bonded with a polymer chain directly or through another atomic group or a terminal modified diene-based polymer that has been first brought into contact with carbon black and a starting rubber B' comprising a diene-based starting rubber, said starting rubbers A' and B' being blended together.

8. A carbon black-containing rubber composition as claimed in claim 7, wherein the average glass transition temperature TgA' of the starting rubber A' and the average glass transition temperature TgB' of the diene-based starting rubber B' satisfy the following relationships:

$$TgA'+20° C. > TgB' > TgA'−10° C. \quad (1)$$

$$20° C. > TgA' > −45° C. \quad (2).$$

9. A carbon black-containing rubber composition as claimed in claim 7 or 8, wherein the weight average molecular weight Mw(A') of the diene-based starting rubber A' of a molecular weight of a range of 100,000 to 1,200,000 and the weight average molecular weight Mw(B') of the diene-based starting rubber B' of a molecular weight of a range of at least 400,000 satisfy the following relationship:

$$0.08 \leq Mw(A')/Mw(B') \leq 1.5.$$

10. A carbon black-containing rubber composition prepared using a starting rubber dissolved in an organic solvent or a starting rubber made into an aqueous emulsion, comprising a starting rubber A' having an average glass transition temperature TgA' of −120 to −15° C. first brought into contact with carbon black, then blended with a starting rubber B' having an average glass transition temperature TgB', which is at least 10° C. higher than TgA'.

11. A carbon black-containing rubber composition as claimed in claim 10, wherein the starting rubber B' is viscoelastically incompatible with the starting rubber A' and the average glass transition temperature TgB' is at least 20° C. more than TgA'.

12. A carbon black-containing rubber composition as claimed in claim 10 or 11, wherein the weight average molecular weight Mw(A') of the diene-based starting rubber A' having a molecular weight of a range of 100,000 to 1,200,000 and the weight average molecular weight Mw(B') of the diene-based starting rubber B' having a molecular weight of a range of at least 400,000 satisfy the following relationship:

$$0.1 \leq Mw(A')/Mw(B') \leq 6.0.$$

13. A carbon black-containing rubber composition as claimed in claim 8 or 9 wherein the starting rubber A' is a terminal modified and/or coupled solution polymerization rubber.

14. A rubber composition for a tire obtained by using a rubber composition containing carbon black claimed in claim 8 or 9.

15. The carbon black-containing rubber composition of claim 10 or 11, wherein the starting rubber A' is a terminal modified and/or coupled solution polymerization rubber.

16. A pneumatic tire comprising the carbon black-containing rubber composition of claim 10 or 11.

17. A process for producing the rubber composition of claim 1, comprising coagulating, dehydrating, and drying a rubber latex mixture containing 50 to 90 parts by weight, in terms of solid components, of latex of said at least one starting rubber A having an average glass transition temperature TgA of −120° C. to −15° C., 40 to 100 parts by weight of carbon black, and 70 parts by weight or less of a softening agent, to thereby obtain a carbon black-containing rubber composition mixing, in an internal mixer, the carbon black-containing rubber composition with said starting rubber B having an average glass transition temperature TgB in the relationship of TgA+10 (°C.)≦TgB, in an amount such that the total amount of the starting rubbers A and B is 100 parts by weight, and a softening agent in an amount such that the total amount of softening agent in the rubber composition is 80 parts by weight or less, to obtain a rubber composition having a ratio $F_A/F_B$ of 1.2 to 3.0, wherein $F_A$ is a concentration of the carbon black in the starting rubber A and $F_B$ is a concentration of the carbon black in the total amount of starting rubbers A and B.

18. A process for producing the carbon black-containing rubber composition of claim 8, comprising bringing said starting rubber A' dissolved in an organic solvent or made into an aqueous emulsion and comprising a polymer having functional groups represented by formula (I):

bonded with a polymer chain directly or through another atomic group or a terminal modified diene-based polymer into contact with carbon black, followed by blending it with said starting rubber B' comprising a diene-based starting rubber.

19. A process for producing the carbon black-containing rubber composition of claim 10, comprising bringing said starting rubber A' dissolved in an organic solvent or made into an aqueous emulsion and having an average glass transition temperature TgA' of −120 to −15° C. into contact with carbon black, followed by blending it with said starting rubber B' having an average glass transition temperature TgB', which is at least 10° C. higher than TgA'.

20. A process for producing the carbon black-containing rubber composition of claim 7 or 10, comprising:

adding the carbon black dispersed in an organic solvent or an emulsion to said starting rubber A' dissolved in an organic solvent or made into an aqueous emulsion, followed by mixing with stirring; and adding thereto said starting rubber B' dissolved in an organic solvent or made into an aqueous emulsion, followed by mixing, precipitating, filtering and drying.

21. A process for producing the carbon black-containing rubber composition of claim 7 or 10, comprising:

adding the carbon black dispersed in an organic solvent or an emulsion to said starting rubber A' dissolved in an organic solvent or made into an aqueous emulsion, followed by mixing with stirring precipitating, filtering and drying; and adding thereto said starting rubber B' in the form of a solid.

* * * * *

UNITED STATES PATENT AND TRADEMARK OFFICE
CERTIFICATE OF CORRECTION

PATENT NO. : 5,962,575
DATED : October 5, 1999
INVENTOR(S) : Fumito Yatsuyanagi et al.

It is certified that error appears in the above-identified patent and that said Letters Patent is hereby corrected as shown below:

<u>Title page,</u>
Item [57], ABSTRACT,
Line 16, "–C=N$^+$–" should read -- C=N$^+$ --.

<u>Column 28,</u>
Line 49, change "–C=N$^+$–" should read -- C=N$^+$ --.

<u>Column 29,</u>
Line 32, "claim 8 or 9" should read -- cliam 7 or 8, --.
Line 37, "claim 8 or 9" should read -- claim 7 or 8 --.

<u>Column 30,</u>
Line 13, change "claim 8" to -- claim 7 --.
Line 17, "–C=N$^+$–" should read -- C=N$^+$ --.

Signed and Sealed this

Eighteenth Day of June, 2002

Attest:

Attesting Officer

JAMES E. ROGAN
Director of the United States Patent and Trademark Office